United States Patent [19]
Menezes et al.

[11] Patent Number: 5,621,894
[45] Date of Patent: Apr. 15, 1997

[54] SYSTEM AND METHOD FOR EXCHANGING COMPUTER DATA PROCESSING CAPABILITES

[75] Inventors: Arul Menezes, Bellevue; Sharad Mathur, Redmond; Michael Ginsberg, Bellevue, all of Wash.

[73] Assignee: Microsoft Corporation, Redmond, Wash.

[21] Appl. No.: 512,948

[22] Filed: Aug. 9, 1995

Related U.S. Application Data

[63] Continuation of Ser. No. 149,507, Nov. 5, 1993, abandoned.
[51] Int. Cl.$^6$ ........................................... G06F 13/00
[52] U.S. Cl. .................. 395/200.12; 395/500; 395/834; 358/406; 358/442
[58] Field of Search ..................................... 358/404, 405, 358/406, 442; 395/200.12–200.14, 200.17, 830, 831, 834

[56] References Cited

U.S. PATENT DOCUMENTS

| | | | |
|---|---|---|---|
| 4,000,371 | 12/1976 | Ogawa | 358/261.1 |
| 5,166,977 | 11/1992 | Ross | 380/18 |
| 5,210,826 | 5/1993 | Takeda et al. | 395/200.14 |
| 5,228,128 | 7/1993 | Kim | 358/442 |
| 5,243,438 | 9/1993 | Anderton et al. | 358/426 |
| 5,268,770 | 12/1993 | Yukino | 358/435 |
| 5,287,199 | 2/1994 | Zoccolillo | 358/402 |
| 5,386,512 | 1/1995 | Crisman et al. | 395/200.17 |

FOREIGN PATENT DOCUMENTS

| | | | |
|---|---|---|---|
| 59070363 | 4/1984 | Japan | H04N 1/32 |
| 2256558 | 12/1992 | United Kingdom | H04N 1/32 |

OTHER PUBLICATIONS

"Fax Reroute Function," IBM® *Technical Disclosure Bulletin*, 32:(6A), pp. 405–406, 1989.

Primary Examiner—Parshotam S. Lall
Assistant Examiner—Viet Vu
Attorney, Agent, or Firm—Seed and Berry LLP

[57] ABSTRACT

A system and method for exchanging data processing capabilities between computers. The computers exchange capabilities so that data transfer between the computers may be made in the most efficient data format possible for the two computers. A first computer, which will receive a data file, sends a list of data processing capabilities to a second computer, which will transmit the data file to the first computer. The transmitting computer examines the capabilities list of the receiving computer as well as its own capabilities list and determines the most efficient data format for the transfer. The transmitting computer may process the data file into an intermediate format for efficient data transfer so that the receiving computer will process the intermediate data file into the desired data format. The capabilities list can be cached for future communication between the computers. The system can update the capabilities list and inform other computers whether their cached capabilities list is current. Capabilities can also be forwarded from one computer to another so that a third computer can determine the capabilities of the first computer from the second computer or the capabilities of the second computer from the first computer. The system is readily applicable to facsimile machines where custom and application data processing capabilities can be exchanged.

42 Claims, 7 Drawing Sheets

SYSTEM AND METHOD FOR EXCHANGING COMPUTER DATA PROCESSING CAPABILITES

CROSS-REFERENCE TO RELATED APPLICATION

This application is a continuation of U.S. patent application No. 08/149,507, filed Nov. 5, 1993, now abandoned.

TECHNICAL FIELD

The invention relates generally to a system and method for exchanging information related to data processing capabilities between computers.

BACKGROUND OF THE INVENTION

Computers are commonly used in the workplace for data processing and storage. Access to computer information is a key element in the successful use of computers. Communication between computers has become a critical aspect of access to the computer information. A local area network (LAN) allows several computers to be coupled together to enhance their computing capability. One computer can access information stored in another computer through the LAN. When information is exchanged between two computers, the information must be in a format that the computers can recognize and process. Information is often exchanged in a standard format such as ASCII, for example. However, an ASCII format exchange may require that the information be converted from its original format to ASCII format. The computer transferring information has no way of determining the data processing capabilities of the receiving computer and, therefore, must convert the information to ASCII on the assumption that ASCII is a "universal" format that all computers can recognize.

One form of computer is a facsimile (FAX) machine. A FAX machine may comprise an interface board within a computer, or may be a stand-alone device employing well-known computer technology. FAX machines are used to transfer information from one location to another. FAX machines of older design had little or no computing power and were limited to scanning a page and transmitting a digitized version of the page to a receiving FAX machine that reproduced the page. Modern FAX machines are essentially a form of computer and often have storage capability allowing the FAX machine to scan a document and store the digitized version of the machine for transmission at a later time, such as when telephone rates decrease at night. The receiving FAX machine can store received messages that are confidential and print them out only when the proper identification code is entered.

To minimize transmission time, FAX machines use data compression techniques well known in the art. An international standard for facsimile transmission has been established by the International Telegraph and Telephone Consultative Committee (CCITT) and published as *Terminal Equipment and Protocols for Telematic Services* (1989). References to CCITT standards are made throughout this disclosure. These standards are well known to those skilled in the art and will not be discussed in detail. To conform to the CCITT standard, all FAX machines have Modified Huffman (MH) encoding capability to compress that digitized data for transmission. Newer FAX machines may also employ MR or MMR encoding techniques to compress the data to a greater extent. The MH and MR data encoding are known as CCITT recommendation T.4 1-dimensional and 2-dimensional encoding, respectively, while the MMR is known as CCITT recommendation T.6 2-dimensional encoding. These data encoding techniques are well known and will not be discussed herein. It is to be understood that reference to a particular encoding capability infers that the particular FAX machine also has the ability to decode that particular data format. For example, a reference to a FAX machine with MMR encoding capability almost always means that the same FAX machine can decode MMR encoded data.

The standardized facsimile data encoding capabilities of a receiving FAX machine are automatically transmitted during what may be termed as the negotiation phase of a facsimile telephone call. The various phases of a facsimile transmission, shown in FIG. 1, are described in the CCITT standards.

Phase A, shown in FIG. 1, is the call establishment phase in which the telephonic communication is established between a calling station and a called station. The calling station is the station initiating the facsimile telephone call and the called station is the station receiving the facsimile telephone call. As is well known, both the calling station and the called station are able to transmit or receive facsimile messages.

Phase B is a pre-message procedure phase or negotiation phase for identifying and selecting facsimile data encoding capabilities between the calling station and the called station. In phase B, the receiving FAX machine transmits a digital identification signal (DIS) data frame that describes the particular data encoding formats that are recognizable to the receiving FAX machine. The individual data bits of the DIS data frame identify the particular facsimile data processing modes of the receiving FAX machine. The DIS data frame is defined by the CCITT standard and cannot be used for other purposes. As previously discussed, the capabilities include data encoding such as MH, MR, and MMR. The MH, MR, and MMR data encoding capabilities are defined within recommendation T.4 and recommendation T.6 of the CCITT standard. In addition to the identification of data encoding capabilities, the DIS data frame is used to provide information about the basic data processing capabilities of the receiving FAX machine. This may include limited information such as resolution (e.g., pixels per inch), paper sizes, and the like. These standardized facsimile data processing capabilities or modes are referred to herein as "CCITT encoding formats." The transmitting FAX machine responds with a confirming signal and selects a mutually compatible CCITT encoding format that allows the most efficient data transfer. The transmitting FAX machine encodes the data according to the selected CCITT encoding format and transmits it to the receiving FAX machine.

Phase C is the actual message transfer phase and comprises two simultaneous phases. Phase C1 is the "In-message" procedure phase, which controls the transfer of data between the transmitting FAX machine and the receiving FAX machine. This includes synchronization, error detection and correction, and line supervision. Phase C2 is the actual data transmission phase in which data is transferred by the transmitting FAX machine to the receiving FAX machine under control of the C1 phase. For simplicity, these simultaneous phases will be referred to as phase C.

Phase D is the post-message procedure phase in which information is transferred regarding the end of message signaling, confirmation signaling and end of facsimile signaling. Phase E is the call release phase in which the telephonic communication between the calling station and the called station is terminated.

The CCITT encoding formats permit basic facsimile communication. However, as with computers coupled together by a LAN, FAX machines may have data processing capabilities that can produce more efficient transmission than merely data encoding using one of the limited CCITT encoding formats. Some FAX machines are actually incorporated into computers by way of a FAX interface board. These computers may have great data processing capability, but the data processing capability cannot be called into play when transmitting or receiving a facsimile because one FAX machine does not know what data processing capabilities the other FAX machine possesses.

Therefore, it can be appreciated that there is a significant need for a system and method for communicating information about data processing capabilities between computers.

SUMMARY OF THE INVENTION

The present invention is embodied in a system for controlling communication between first and second computers, the first computer having at least a first custom data processing mode and the second computer having at least a second custom data processing mode compatible with the first custom data processing mode. The system includes a first application mode storage area in the first computer having a first application data processing mode list containing at least one application data processing mode of the first computer. A second application mode storage area in the second computer has a second application data processing mode list containing at least one application data processing mode of the second computer.

A capability transfer means transfers the first custom and application data processing mode lists from the first computer to the second computer. Selection means within the second computer select a transfer form in which to transfer a data file from the second computer to the first computer. The selection means uses the first and second application mode lists to determine if the transfer form is mutually compatible with the data processing capabilities of the first and second computers. The selection means uses a mutually compatible data processing mode from the first and second custom mode lists if the first and second application mode lists do not have a mutually compatible data processing mode.

The system may further include a conversion processor within the second computer for converting the data file into the transfer form. Communication controllers within the first and second computers control the transfer of the data file in the transfer form from the second computer to the first computer. The second computer may process the data file into an intermediate form based on the first application mode list with the intermediate form being the transfer form. The first computer receives the data file in the intermediate form and further processes it into a final form different from the intermediate form.

The second computer may forward the first application mode list to a third computer upon receipt of a capabilities forwarding request from the third computer. The system may further include a capabilities storage area in the second computer for storing the first application mode list, with the selection means using the stored first application mode list for transfer of subsequent data files from the second computer to the first computer. The system may further include detection means within the second computer to determine if the first application mode list matches the stored first application mode list and generates a detection signal if the lists do not match. The second computer requests the first application mode list from the first computer if the change detection signal is generated. The selection means then uses the first application mode list instead of the stored first extended mode list.

The first custom mode list may be automatically transferred to the second computer. The first application mode list may be transferred to the second computer only upon request.

In an alternative embodiment, the first and second computers are facsimile machines having a facsimile mode storage area containing facsimile data processing modes of the first and second facsimile machines, respectively. Capability transfer means automatically transfer the first facsimile data processing mode list from the first facsimile machine to the second facsimile machine.

A custom data processing mode list may be transferred from the first facsimile machine to the second facsimile machine. Selection means within the second facsimile machine select a transfer form in which to transfer a data file from the second facsimile machine to the first facsimile machine. The selection means uses the first and second custom mode lists to determine a mutually compatible transfer form which is compatible with the data processing capabilities of the first and second facsimile machines. The selection means uses a mutually compatible data processing mode from the first and second facsimile mode lists if the first and second custom mode lists do not have a mutually compatible data processing mode.

The system may further include first and second application data processing mode storage areas in the first and second facsimile machines, respectively, each containing an application data processing mode list of application data processing capabilities of the first and second facsimile machines. The capability transfer means transfers the first application data processing mode list from the first facsimile machine to the second facsimile machine upon receipt of an application mode list request command. The selection means within the second facsimile machine selects a mutually compatible transfer form based on the first and second application data processing mode lists, the first and second custom data processing mode lists, and the standard facsimile data processing mode list.

DETAILED DESCRIPTION OF THE INVENTION

Figure 1:
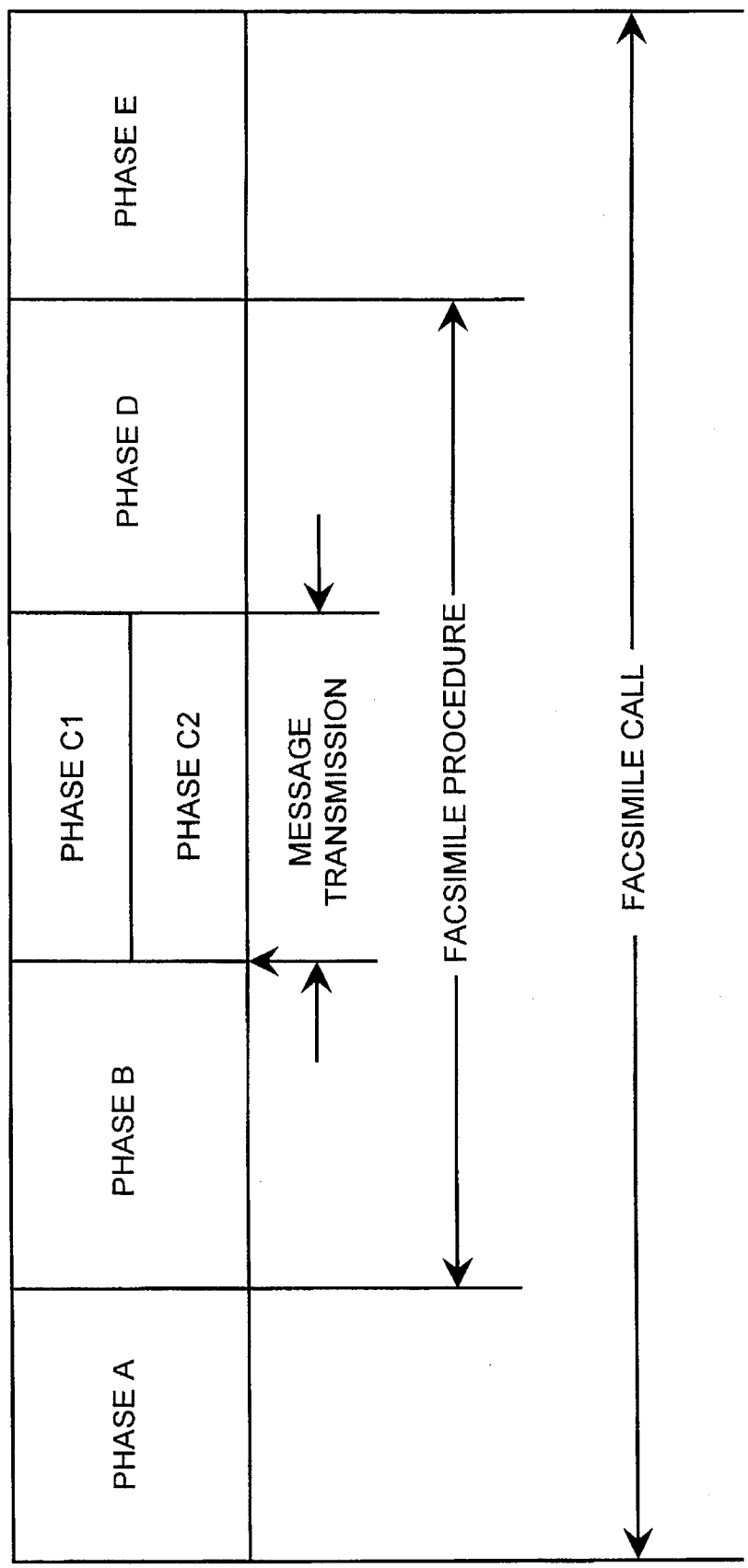
FIG. 1 illustrates the various standard phases of operation of a conventional machine.

The present invention describes a system and method for exchanging information between computers relating to the data processing capabilities of the computers. While the examples provided below are directed to capabilities exchange between FAX machines, the principles of the present invention are applicable to computers other than FAX machines.

The present invention allows the transfer of information between the receiving FAX machine and the transmitting FAX machine regarding the data processing capabilities of the respective FAX machines other than the CCITT standard formats. The FAX machine of the present invention utilizes a custom set of data processing capabilities, or custom capabilities, and a set of application data processing capabilities, or application capabilities that are associated with application programs. The CCITT standard provides the ability to transmit a non-standard facilities (NSF) data frame during the negotiation phase (phase B). The NSF data frame permits greater flexibility in the format of transmitted information. NSF data frames are sometimes used in the prior art to transmit user identification information, passwords, and facsimile relay information. The present invention uses the NSF data frame to transfer a list of the custom data processing capabilities that the receiving FAX machine has at its disposal. The custom capabilities exceed the CCITT standard encoding formats defined in the DIS data frame, and include information about imaging capabilities, polling capabilities, and the like. The custom capabilities will be discussed in detail below.

The present invention also has the ability to transfer a list of application data processing capabilities from the receiving FAX machine to the transmitting FAX machine. The application capabilities list may contain such information as the application programs available, such as would be useful if the FAX machines are interface boards in computers. For example, a computer may contain a data spreadsheet, a word processor, a sound board for voice communication, in addition to a FAX board. Application capabilities include data processing information about application programs such as the version number of the program. Application capabilities are exchanged during the data transfer phase (phase C) rather than in the negotiation phase (phase B). Furthermore, application capabilities are exchanged only upon request from the transmitting FAX machine during the data transfer phase (phase C).

The receiving FAX machine indicates the presence of application capabilities in the NSF data frame. The transmitting FAX machine receives the NSF data frame and determines whether or nor to request the application capabilities.

The present invention uses the exchanged custom and application capabilities lists to provide the data in the most appropriate format for transfer from one FAX machine to another. If the data to be transferred is in the form of a spreadsheet, the data can be transferred in that format rather than converting the data to printed pages, scanning the pages and transmitting the data using the standard facsimile data encoding capabilities. For example, the data may be in a format such as the Windows™ Printing System data format, in which data is formatted in predetermined data frames. If the receiving FAX machine has indicated that it can process Windows™ Printing System data frames, the transmitting FAX machine will send the data in that format. As can be readily seen, the ability to determine the precise capabilities of the receiving FAX machine allows the transmitting FAX machine to use the most efficient means for transferring data and permits the transfer of higher level data forms that increase the functionality of the FAX machines.

Figure 2:
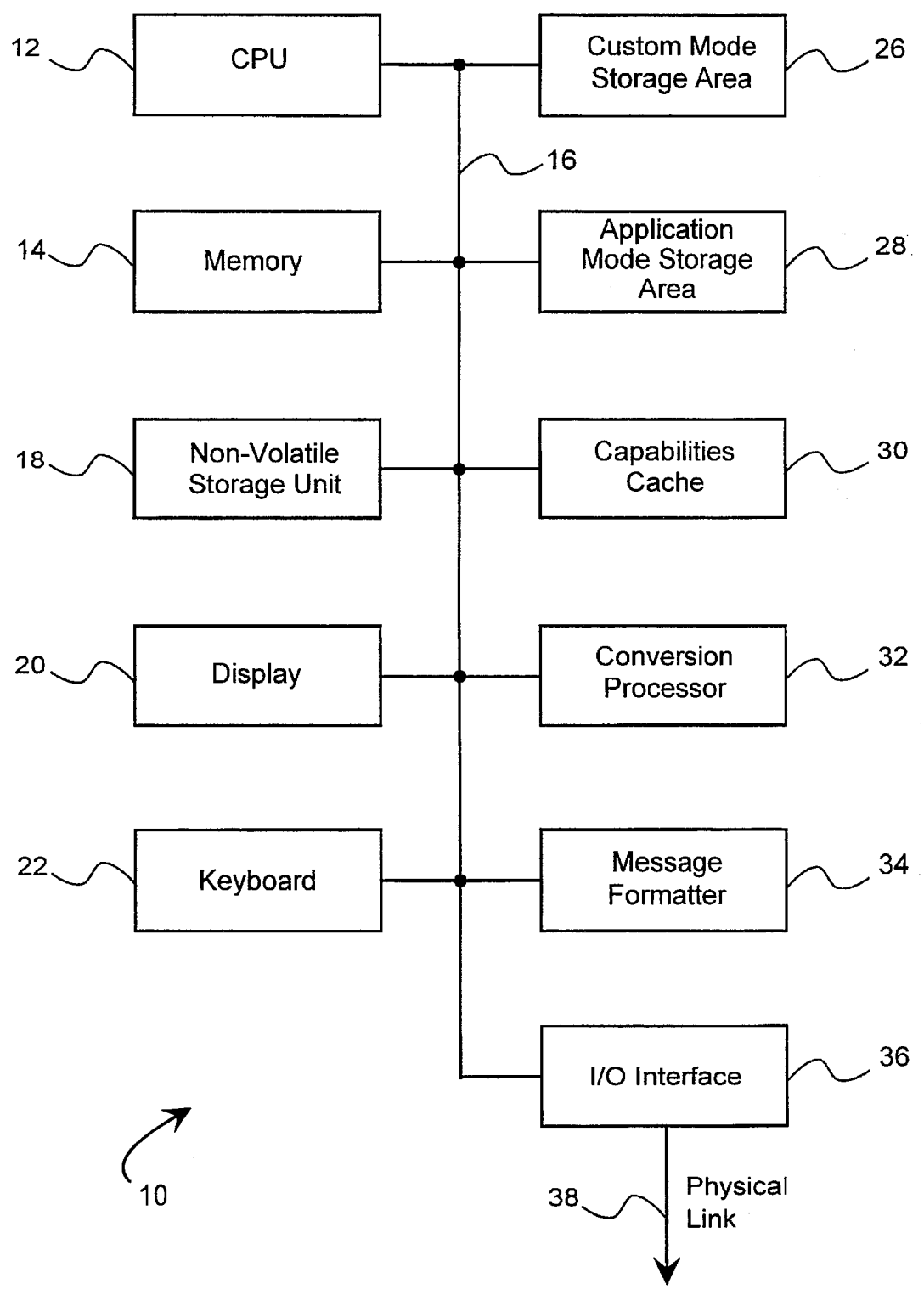
FIG. 2 is a functional block diagram of a system according to the present invention.

The present invention is embodied in a system 10, shown in block diagram form in FIG. 2. A central processing unit (CPU) 12 is coupled to a memory 14 by a bus 16. The memory 14 may comprise random access memory (RAM) and read only memory (ROM). The bus 16 may carry data signals, control signals and power to the various components of the system 10. A non-volatile storage unit 18 such as a floppy disk or a hard disk may also be coupled to the CPU 12 by the bus 16. A display 20, such as a video display, LCD display, touch-sensitive display, or other display, and a keyboard 22 are coupled to the CPU 12 by the bus 16. Not all of the above described components are required for operation according to the principles of the present invention. For example, if the system 10 is part of a FAX machine, it will be appreciated that there may not be a display 20, and the keyboard 22 may be a telephone style numeric keypad to permit the user to enter the telephone number of the FAX machine to which a facsimile message is being sent. A non-volatile storage unit 18 may also not be present if the system 10 is part of a FAX machine.

The system 10 also contains a custom mode storage area 26 which stores the custom data processing capabilities of the system. An application mode storage area 28 stores a list of application data processing capabilities of the system 10. A capabilities cache 30 stores lists of custom and application capabilities received from other systems of the present design. The capabilities cache 30 also stores a data code associated with the capabilities for each specific receiving FAX machine which is used to indicate whether the stored list accurately reflects the current capabilities of the receiving FAX machine. As will be explained below, the list of stored capabilities can be used for future communication between two systems of the present design. A conversion processor 32 processes a data file into the desired form for data transfer. Operation of the conversion processor 32 to convert a data file from one form to another is well known in the art and will not be described in detail.

A message formatter 34 places the data file and the application capabilities list into the proper format for transfer. In the present embodiment, the data file is "linearized" by the formatter 34. Linearization refers to the process of linking the various component of a facsimile message such as the message sender information, message recipient information, and the data file itself so that the facsimile message components may be placed in one location in the memory 14 to simplify the transmission of the facsimile message. An I/O interface 36 controls the actual transfer from the system 10 to a system of another computer. It can be appreciated that the specific form of the I/O interface 36 depends on the particular application. For example, the system 10 could be part of a FAX machine, in which case the I/O interface 36 is a facsimile modem interface. If the system 10 is part of a computer coupled to other computers on a network, the I/O interface 36 is a local area network (LAN) interface, a serial interface or the like. The present invention is not to be limited to the particular interface or environment in which the system 10 is operating. A physical link 38 couples the system 10 to another system of the same design or to a prior art system. As with the I/O interface 36, the specific form of the physical link 38 depends on the particular application. The physical link 38 may be a wire cable such as a LAN cable or a serial cable or a telephone line. However, the physical link 38 may also be a microwave link or a satellite link if the system 10 is coupled remotely to another computer. If the system 10 is part of a FAX machine, the telephone line coupling one FAX machine to another may also be a wire cable, microwave link, satellite link, or the like. The present invention is not to be limited by the specific form of the physical link 38.

Figure 3:
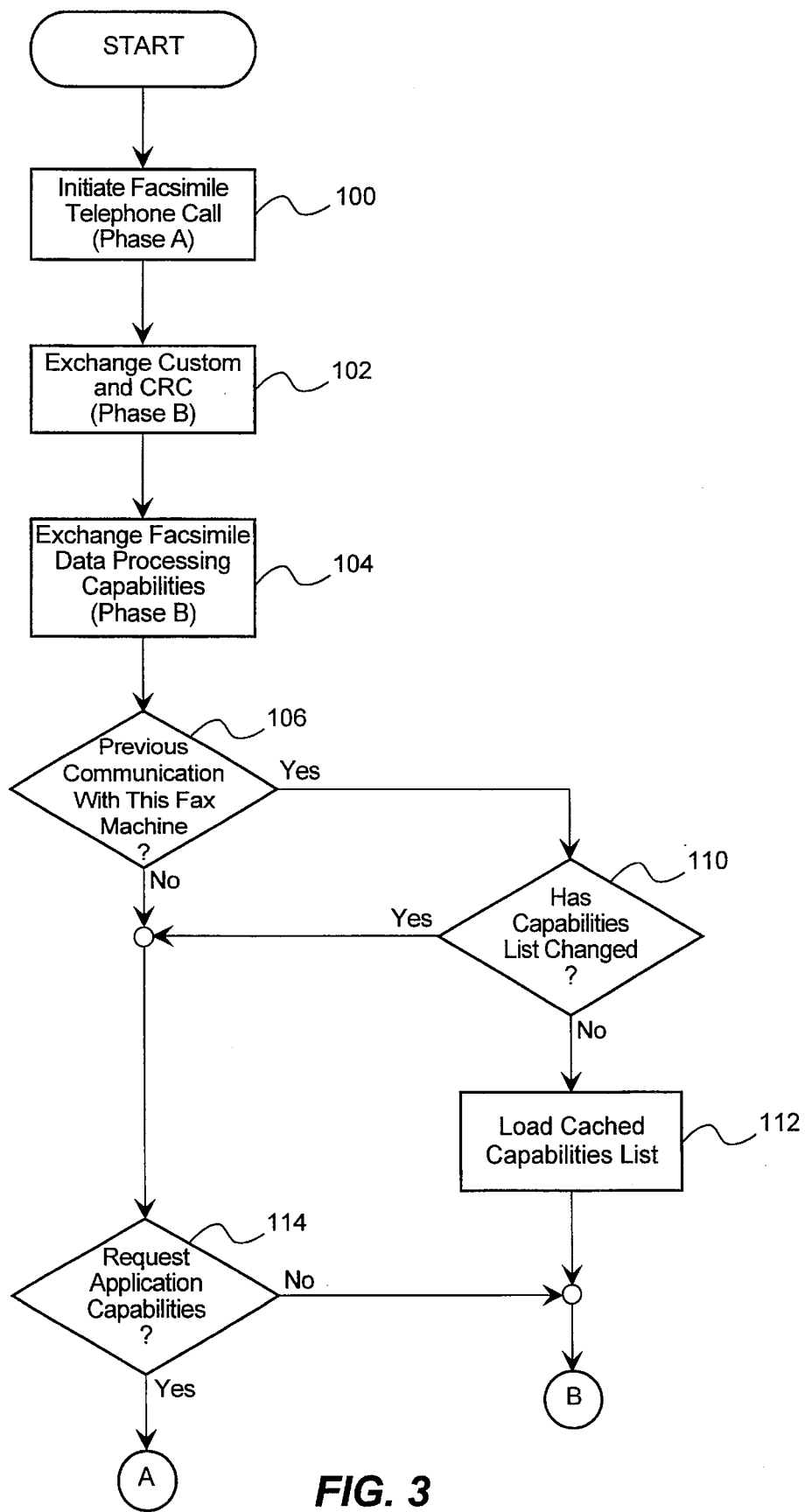
FIG. 3 is a flow chart of the operation of the system of FIG. 2.
Figure 4:
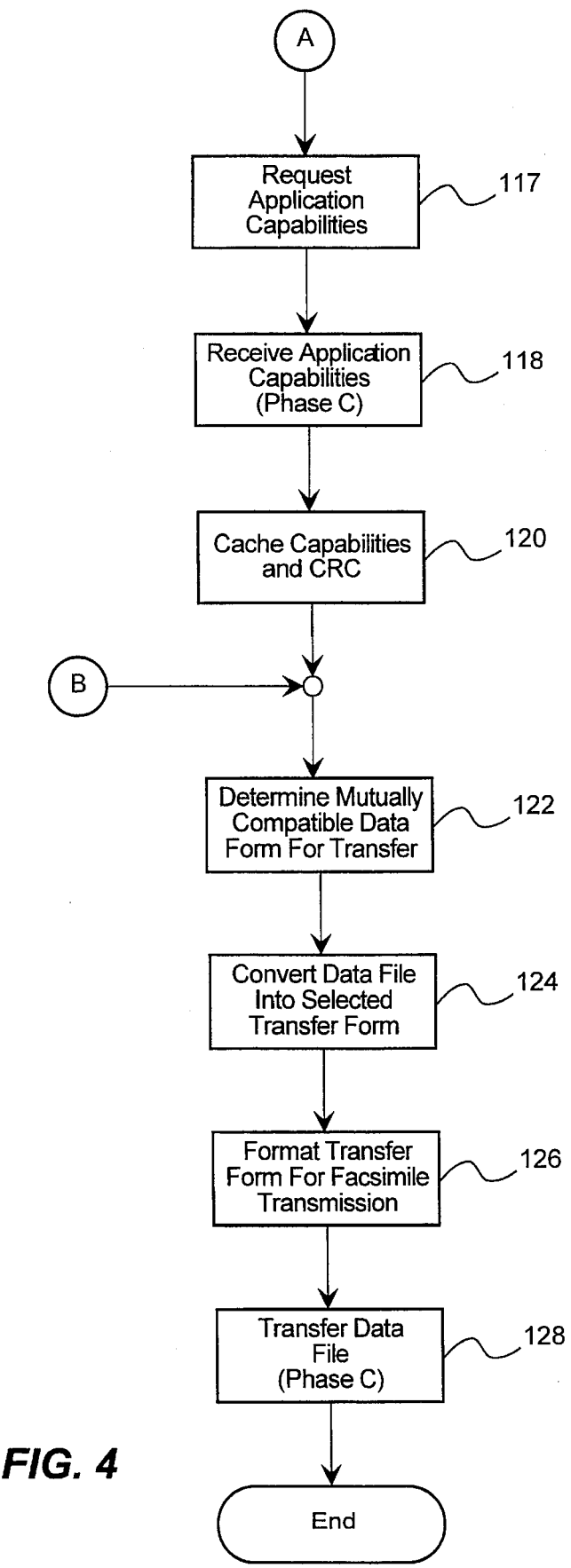
FIG. 4 is a continuation of the flow chart of FIG. 3.

The following description of operation of the system 10 shown in the flow charts of FIGS. 3 and 4 relate to a FAX machine, however, it should be appreciated that the principles of the present invention are not limited to FAX machines. The flow charts of FIGS. 3 and 4 are from the perspective of the transmitting FAX machine. The transmitting FAX machine determines the transfer form based on the data processing capabilities of the transmitting and receiving FAX machines. Alternatively, the receiving FAX machine could specify the desired transfer form based on the final data form desired by the receiving FAX machine.

When a facsimile telephone call is first initiated in step 100, shown in FIG. 3 (phase A of FIG. 1), neither the transmitting nor receiving FAX machine knows the data processing capabilities of the other. This assumes that there has been no previous communication between the transmitting and receiving FAX machines. If there had been previous communication between the transmitting and receiving FAX machines, the custom and application capabilities would have been previously exchanged and stored in the capabilities cache 30 (see FIG. 2) of the transmitting FAX machine. If the transmitting FAX machine is initiating the facsimile telephone call, the receiving FAX machine can be identified by the facsimile telephone number. Alternatively, the FAX machines can be identified by identification data (e.g., CSI data frame) exchanged between them in a manner well known and described in the CCITT standards. The system 10 uses the negotiation phase (Phase B of FIG. 1) to exchange the list of custom capabilities above and beyond the CCITT encoding formats. In step 102 the custom capabilities are exchanged using the NSF data frames. Note that the custom capabilities are stored in the custom mode storage area 26 (see FIG. 2) of the receiving FAX machine. The precise manner of custom capabilities exchange using the NSF data frames will be described below. The custom capabilities are always transmitted by the receiving FAX machine regardless of whether they are actually used or not.

A cyclic redundancy check (CRC) relating to the application capabilities is also transmitted with the custom capabilities in step 102. The user may add data processing capabilities to the system 10 from time to time, which causes the application capabilities CRC to be changed. The application capabilities CRC, which is a form of checksum, is a well-known technique for determining the validity of the stored data. When capabilities are stored in the capabilities cache 30 (see FIG. 2), the application capabilities CRC is stored with the capabilities. During a subsequent facsimile communication, the transmitting FAX machine will compare the received application capabilities CRC with the previously stored application capabilities CRC for the receiving FAX machine to determine if the cached capabilities stored within the capabilities cache 30 (see FIG. 2) are current. If the stored application capabilities CRC matches the transmitted application capabilities CRC, the capabilities stored in the capabilities cache 30 are current and may be used by the transmitting FAX machine. If the stored application capabilities CRC does not match the transmitted application capabilities CRC, the capabilities stored in the capabilities cache 30 are outdated.

The CCITT encoding formats, such as MH, MR, and MMR, are exchanged in step 102 during the negotiation phase (phase B of FIG. 1), as previously described.

In decision 106, the system 10 determines whether there has been previous communication with the receiving FAX machine. As discussed above, the system 10 can determine the identity of the receiving FAX machine from the facsimile telephone number or from the identification data exchanged between the transmitting and receiving FAX machines. If there has been no previous communication with the receiving FAX machine, the result of decision 106 is NO. If there has been previous communication with the receiving FAX machine, the result of the decision 106 is YES, and the system 10, in decision 110, determines if the capabilities lists have changed since the last facsimile communication. The capabilities lists includes both custom capabilities and application capabilities that are stored within the capabilities cache 30 (see FIG. 2). The system 10 determines whether the capabilities lists have changed by comparing the application capabilities CRC received with the custom capabilities list in step 104 with the application capabilities CRC stored in the capabilities cache 30 (see FIG. 2) for the specific receiving FAX machine.

If the capabilities lists have not changed since the previous communication with the receiving FAX machine, the result of decision 110 is NO, and the system 10 loads the cached capabilities list in step 112. If the capabilities lists have changed, the result of decision 110 is YES.

If the result of decision 106 is NO (i.e., there has been no previous communication with the receiving FAX machine) or the result of decision 110 is YES (i.e., the capabilities list has changed since the last facsimile communication), the system 10, in decision 114, determines whether to request the extended capabilities list. As previously discussed, the custom capabilities list is always sent, but the application capabilities list is only sent upon request from the transmitting FAX machine. The decision to request application capabilities depends on the capabilities of the transmitting FAX machine itself. If the transmitting FAX machine has no application capabilities, there is no need to request the application capabilities list from the receiving FAX machine. If the system 10 does request the application capabilities list, the result of decision 114 is YES, and in step 117, shown in FIG. 4, the transmitting FAX machine sends a request for the application capabilities list. In response to the request for the application capabilities list, the receiving FAX machine, in step 118, sends the application capabilities list to the system 10. Note that the application capabilities list is stored in the application mode storage area 28 (see FIG. 2) of the receiving FAX machine. If the system 10 does not request the application capabilities list, the result of decision 114 is NO. In that event, or if the system 10 has loaded the cached capabilities list in step 112, the receiving FAX machine does not send the application capabilities list to the system.

If the receiving FAX machine has sent the application capabilities list in step 118, in step 120 the system 10 caches the already received custom capabilities and the application capabilities list in the capabilities cache 30 (see FIG. 2) along with the associated application capabilities CRC. As previously indicated, the transmitting FAX machine stores both the custom capabilities list and the application capabilities list within the capabilities cache 30. Storing the custom capabilities list in the capabilities cache 30 allows the transmitting FAX machine to begin processing the data file before a facsimile telephone call is even initiated. For example, if the transmitting FAX machine has a data file formatted for 8.5"×14" paper and is instructed to send the data file to a receiving FAX machine that can only process 8.5"×11" paper, the transmitting FAX machine can use this information, which is stored in the capabilities cache 30, to begin scaling the data file for transmission in an 8.5"×11" format. Thus, the stored capabilities lists permit more efficient data processing and transfer than is possible in the prior art.

In step 122, the system 10 determines the most efficient mutually compatible data form for transfer to the receiving FAX machine. The system selects the mutually compatible data form using the application capabilities list transferred in step 118 or loaded from the capabilities cache 30 (see FIG. 2) in step 112, the custom capabilities list exchanged in step 102, or the CCITT encoding formats (MH, MR, or MMR) exchanged in step 104.

Generally speaking, the most efficient transfer form of the data file uses one or more of the custom and/or application capabilities. For example, the transmitting FAX machine may use a custom capability relating to resolution plus a custom capability relating to data compression plus an application capability relating to a particular spreadsheet application program. Thus, the most efficient transfer form of a data file may involve the use of several capabilities.

Prior art FAX machines convert the data file to one of the limited CCITT encoding formats for transmission. However, the capabilities exchange of the system 10 permits transmission in many alternative formats. If the data file is already in a form that can be processed directly by the receiving FAX machine, there is no need to convert the data file to one of the CCITT encoding formats. The data transmission itself is also more efficient because there is not a pixel-by-pixel transmission of the data file as is done with the CCITT encoding formats. The system 10 first determine whether there is a mutually compatible application capability to use as the most efficient transfer form. If there are no mutually compatible application capabilities, the system 10 will then determine whether there are common custom capabilities to use as the most efficient transfer form. The transmitting and receiving FAX machines may not have a mutually compatible data processing mode that allows a more efficient data transfer than the CCITT encoding formats. In that event, the system 10 will use one of the CCITT encoding formats.

Figure 5A:
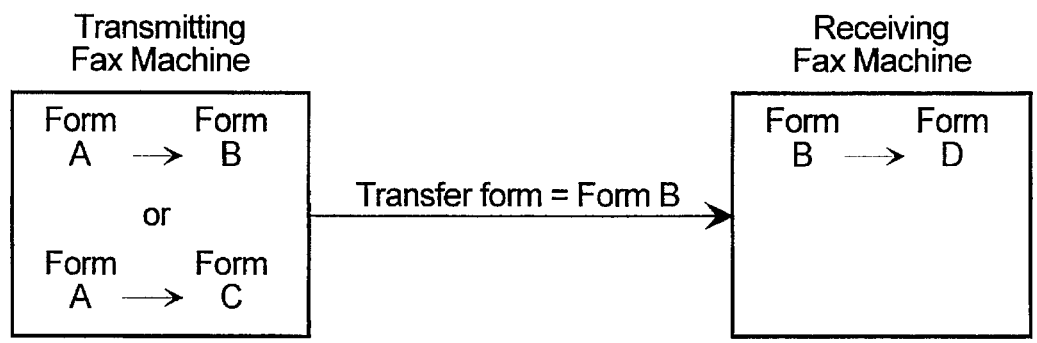
FIG. 5A illustrates conversion of a data file by the system of FIG. 2 to an intermediate transfer form.
Figure 5B:
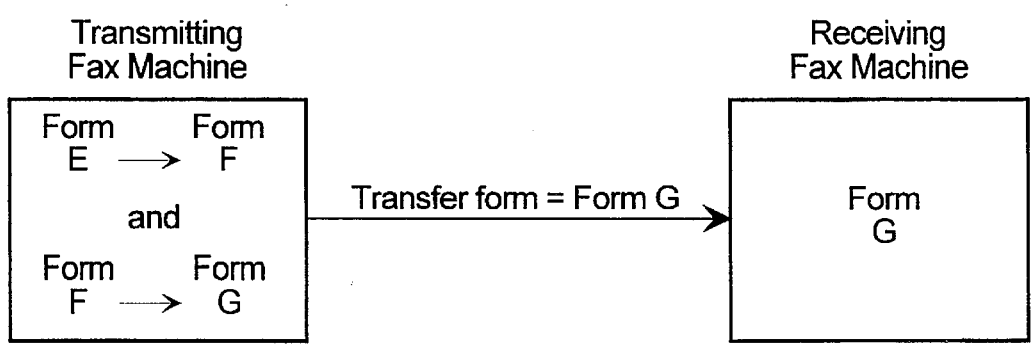
FIG. 5B illustrates multiple conversions of a data file by the system of FIG. 2 into a transfer form.

The system 10 may use an intermediate data format for the most efficient transfer of data and require that the receiving FAX machine convert the data file into a desired format after it has received the data file. For example, assume that the transmitting FAX machine has a data file stored in a particular format that we shall designate as Form A, shown in FIG. 5, and can use its custom and application capabilities to convert the data file from Form A into either of two data formats designated as Form B or Form C, and the receiving FAX machine can use its custom and application capabilities to convert the received data file only from Form B to a data format designated as Form D. The transmitting FAX machine will use its capabilities to convert the data file into Form B as the transfer form and the receiving FAX machine will use its capabilities to convert the received data file from Form B to Form D. Note that the receiving FAX machine may also process the data file in Form B without converting it to Form D. Thus, the system 10 takes the data processing abilities of the transmitting and receiving FAX machine into account when determining the most efficient transfer form for the data file. Similarly, the system 10 may convert the data file more than one time to place the data file into the desired transfer form. For example, if the receiving FAX machine can only process a data file in a format designated as Form G, as shown in FIG. 5B, and the transmitting FAX machine can render the data file from its present data format designated as Form E to a data format designated as Form F, or from Form F to Form G, the system 10 will convert the data file two separate times to place the data file into transfer Form G.

In step 124 of FIG. 4, the system 10 converts the data file into the selected transfer data form for transmission to the receiving FAX machine. In step 126, the system 10 formats the data file using the linearization process described above. In step 128, the system 10 transfers the data file to the receiving FAX machine.

Custom capabilities are differentiated from application capabilities based on their expected frequency of use and the difficulty in transmitting the respective capabilities lists. For example, a particular data processing format that is frequently used would be included in the custom capabilities list, which is always exchanged. It would be inadvisable to classify a frequently used capability as an application capability because it would be requested so often that the time to request the application capabilities list and actually transfer it would exceed the time to simply exchange the list in the negotiation phase (phase B in FIG. 1). Conversely, if there is a seldom used capability, it is inadvisable to classify it as a custom capability because it is seldom used and it takes time to include it in the custom capabilities list that is always exchanged. Custom capabilities tend to be smaller in size than application capabilities. The compactness of the custom capabilities data permits the transmission of custom capabilities in NSF data frames, which have limited size. In contrast, application capabilities tend to be larger in size and are thus difficult to exchange in NSF data frames. Therefore, application capabilities are exchange in Phase C of FIG. 1. In the presently preferred embodiment, custom capabilities are updated with new revisions in the software that operates the system.

Figure 6:
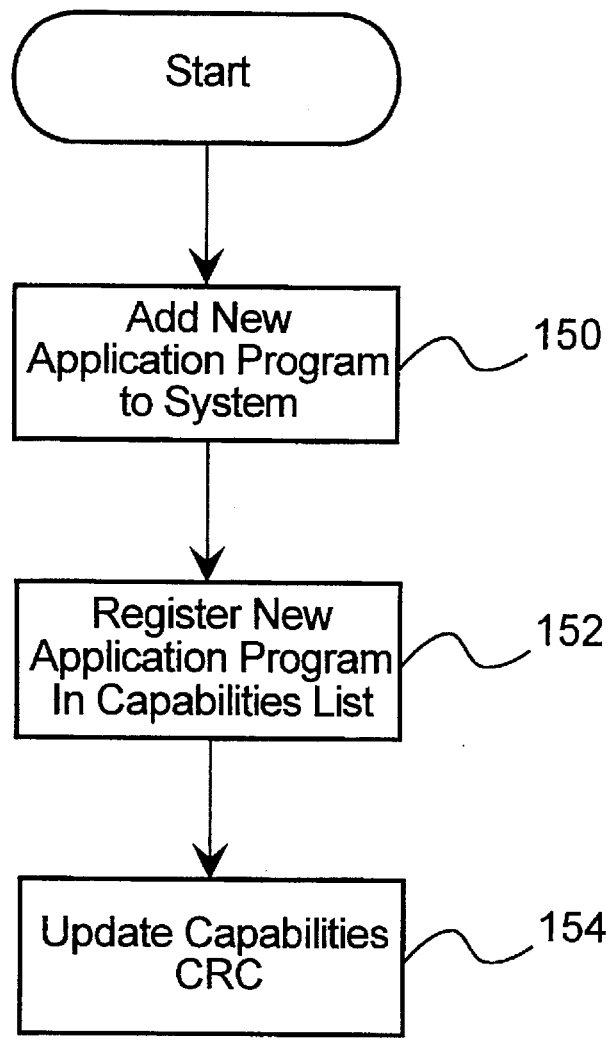
FIG. 6 is a flow chart of the registration of a new application by the system of FIG. 2.

The system 10 does provide a mechanism for an end-user to enter new capabilities into the application capabilities list. As seen in FIG. 6, the end-user adds a new application program to the system 10 in step 150. In step 152, the system 10 registers the new capability in the application capabilities list stored in the application mode storage area 28 (see FIG. 2). In step 154 the system 10 updates the application capabilities CRC, indicating a change in the capabilities.

Figure 7:
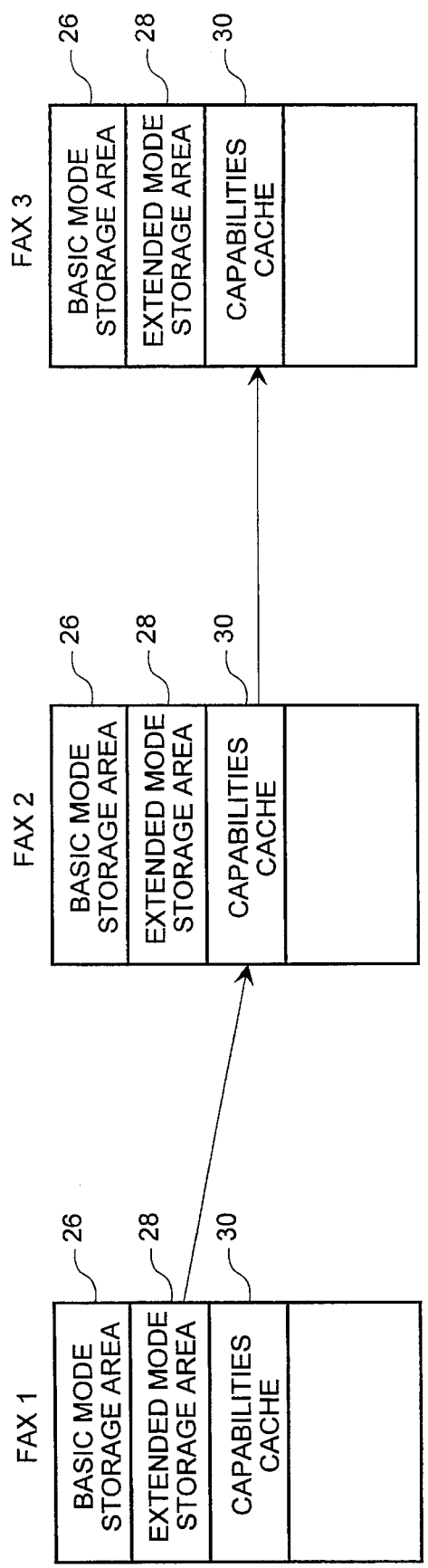
FIG. 7 is a block diagram illustrating capabilities forwarding using the system of FIG. 2.

According to the principles of the present invention, the capabilities lists can be forwarded from one FAX machine to another. As shown in FIG. 7, a first FAX machine transfers its capabilities list to a second FAX machine in the manner described above. The second FAX machine stores the capabilities lists in the capabilities cache 30 (see FIG. 2) as previously discussed. The second FAX machine, in response to a request from a third FAX machine, can forward the capabilities list for the first FAX machine from the second FAX machine's capabilities cache 30. This permits the third FAX machine to efficiently communicate with the first FAX machine without having to request the capabilities of the first FAX machine. The system 10 forwards both custom capabilities and application capabilities. There are many well known security provisions that may be included in the FAX machines to prevent the unauthorized forwarding of capabilities. The system 10 will not forward capabilities unless authorized.

As previously discussed, the system 10 uses the CCITT provisions for NSF data frames to transmit the custom capabilities list. While the communication between FAX machines conforms to the CCITT standard commands, the information and data format used by the system 10 is not known in the prior art. After a facsimile telephone call is first initiated (phase A of FIG. 1), the system 10 enters the negotiation phase (Phase B of FIG. 1). The receiving FAX machine transmits an NSF data frame following the called station identification (CED) signal. According to the principles of the present inventions, the receiving FAX machine containing the system 10 transmits one or more NSF data frames indicating to the transmitting FAX machine that there are custom data processing capabilities beyond the standard facsimile data processing capabilities (i.e., beyond MH, MR, or MMR). The NSF data frames contain information describing the basic capabilities and also contains a data field indicating whether the receiving FAX machine has application capabilities. The NSF data frames also contain the application capabilities CRC described above.

The system 10 attaches the data file (or files if multiple messages are being sent) to the various messaging headers data headers and transmits the facsimile message. The headers and data file are formatted by the message formatter 34 (see FIG. 2) into the linearized format. If the system 10 is sending a data file to a Group-3 FAX machine, the system uses the DIS data frame to construct a list of the CCITT encoding formats from the CCITT encoding formats available. If the data files to be sent are all currently in an acceptable CCITT encoding format (MH, MR, or MMR), the system 10 sends the data files in Phase C of FIG. 1.

If the system 10 is communicating with a system of the same design, the receiving FAX machine may send one or more NSF data frames containing the custom capabilities list. The DIS data frame, containing the CCITT encoding formats, is also sent at the same time. A non-standard setup (NSS) data frame is used to indicate that a facsimile message that follows is in the linearized format, rather than according to the CCITT standards and the facsimile message employs one or more of the custom or application capabilities.

The system 10 also permits turnaround polling, which is well known in the prior art. With turnaround polling, the transmitting FAX machine requests that the receiving FAX machine transmit a facsimile message. If a turnaround request is transmitted, the transmitting FAX machine sends its custom capabilities list using the non-standard command (NSC) provisions of the CCITT. The format of the NSC is identical to that of the NSF. The NSC may be accompanied by a calling subscriber identification (CIG) and a digital transmit command (DTC) data frame. The DTC data frame is identical in format with the DIS data frame. On subsequent turnarounds, there is no need to exchange custom capabilities again. Therefore, only a minimal NSC is transmitted.

Custom Capabilities Formatting

The encoding scheme chosen for the custom capabilities is a compromise between compactness of data and flexibility. Custom capabilities have been divided into groups of closely related capabilities and each capability group is encoded separately. This permits easier expansion by allowing the deletion of an entire obsolete group and/or adding of new groups and allows full backward and forward compatibility (i.e., systems of the present invention can exchange capabilities from other systems of the same design that have either greater or lesser capabilities. In addition, the NSF (or NSC) data frames may be encrypted by any one of a number of well known data encryption algorithms such as Digital Encryption Standard (DES). This prevents the unauthorized exchange of capabilities and facsimile messages by the system 10 and makes the capability information secure against activities such as line-tapping.

Each capability group has a uniform capability group header beginning with a GroupLength field indicating the number of bytes of the data field to follow. If the capabilities receiver does not understand this group, it can skip over the number of bytes specified in the GroupLength. The GroupLength also allows the capabilities receiver to know when one capabilities group ends and a new capabilities group begins. The GroupLength is followed by a GroupNum data field which provides a unique identification of the particular capabilities group. The remainder of any group capability structure beyond the GroupLength and GroupNum data fields has an arbitrary format and variable length (there must be a whole number of bytes). The format for each group of capabilities varies following the GroupLength and GroupNum data fields.

The format of the uniform capability header is shown in Table-1 below

TABLE 1

```
typedef struct
{
    WORD    GroupLength    :6;   //Length of group in bytes incl. this hdr
    WORD    GroupNum       :5;   //one of the GROUPNUM_values
}
BCHDR, near* NPBCHDR, far* LPBCHDR;
```

The GroupLength field is the size, in bytes, of the capability group, including the bytes occupied by the header.

The following Capability Groups are currently defined: Standard, Identifier, Image, Polling Capabilities and Poll Request. These are described in detail below. The extensibility of this encoding scheme also allows other capability groups to be defined. The value of the GroupNum data field for the currently defined capability groups is shown below.

```
#define GROUPNUM_STD        1
#define GROUPNUM_POLLCAPS   2
#define GROUPNUM_POLLREQ    3
#define GROUPNUM_IMAGE      4
#define GROUPNUM_TEXTID     5
```

Alternatively, the capability groups could be sent in a predetermined sequence in which the GroupNum data field would not be required.

The format of the Standard Capabilities Group is shown in Table-2 below.

TABLE 2

```
typedef struct
{
    WORD    GroupLength    :6;   //length of this group in bytes
    WORD    GroupNum       :5;   //must be GROUPNUM_STD
    WORD    vMsgProtocol   :3;   //version of linearized msgs accepted
    WORD    fBinaryData    :1;   //accepts binary files in linearized msgs
```

TABLE 2-continued

| | | | |
|---|---|---|---|
| WORD | fInwardRouting | :1; | //supports routing of recvd msgs //2bytes |
| BYTE | vSecurity | :3; | //version of msg security supported |
| BYTE | vMsgCompress | :2; | //version of msg compression supported |
| BYTE | Undefined | :3; | /currently undefined/unused //3bytes |
| BYTE | OperatingSys | :3; | //which host operating system |
| BYTE | vShortFlags | :2; | //how short can V .21 preamble be |
| BYTE | vInteractive | :3; | //version of interactive protocol supported //4bytes |
| BYTE | DataSpeed | :5; | //Data modem modulations/speeds //supported |
| BYTE | DataLink | :3; | //Data-link protocols supported //5bytes |

}
BCSTD, near* NPBCSTD, far* LPBCSTD

The Standard Capabilities Group has the GroupLength and GroupNum data fields as described above. Other data fields indicate the capabilities of the system 10 and the version of software supporting those capabilities. For example, the fInwardRouting data field indicates the ability of the system 10 to route received messages to the final recipient, and the availability of message encryption and compression (and the version of each). Other data fields indicate the host operating system and the support, if any, for short flags, interactive protocols, data modem modulations, and data link protocols.

The version number of various capabilities shown in the data fields in Table 1 are used to indicate the level of support for that particular capability. The data fields that follow the version prefix (a lower case v) are integers using a predefined version data field format. A 00 means that a particular capability is not supported at all. Any integer greater than 00 indicates the level of support. For example, a data value of 1 indicates the first version of the software. A data value of 2 indicates version 2, which supports all aspects of version 2 as well as version 1. Thus, the software supporting the system 10 is upward compatible. A first one of the system 10 may communicate with a second one of the system of the same design if the second system has a version number greater than or equal to the version number of the first system with respect to the particular feature.

It should be noted that the compression data field shown in Table 1 indicates the availability, if any, of data compression methods in addition to CCITT formats (i.e., MH, MR, and MMR). If this data field is 00, indicating that no additional compression capabilities are available, it does not imply that the CCITT encoding formats (i.e., MH, MR, and MMR) are not available. The CCITT encoding formats are described in the DIS, as previously discussed.

The system 10 must be able to cope with variable length data fields. All capability group structures are defined so that a data field value of 00 indicates that a particular group is not supported or is not available. This minimizes the data transmitted by only requiring as little of the group structure be transmitted as necessary. The system 10 will only transmit capabilities up to and including the last non-zero byte. The GroupLength data field is always set to the number of data bytes actually sent and includes the size of the GroupLength and GroupNum data fields. For example, if the receiving FAX machine does not support data modem modulations and data link protocols, it will send only the first four data bytes of the Standard Group to the transmitting FAX machine. The transmitting FAX machine expects a certain number of data bytes for each capability group, based on the version number of the software on the transmitting FAX machine. If an NSF is received by the transmitting FAX machine and the actual number of bytes received is less than the expected length, as indicated by the GroupLength data field, the system 10 sets the missing data bytes to 00 as if the full structure was received with those bytes explicitly set to 00. This situation may occur when the transmitting FAX machine has a higher software version number than the receiving FAX machine. Thus, the transmitting FAX machine will not use any capabilities beyond what the receiving FAX machine is capable of processing. However, if the GroupLength is greater than the length expected by the transmitting FAX machine, the transmitting FAX machine will ignore the extra bytes. This situation may occur when the receiving FAX machine has a higher software version that the transmitting FAX machine. Thus, the transmitting FAX machine will ignore any capabilities beyond those that it can process.

One of the capability group structures is the Identifier Capability Group, shown in Table 3 below.

TABLE 3

| | | | |
|---|---|---|---|
| typedef struct | | | |
| { | | | |
| WORD | GroupLength | :6; | //length of this group in bytes |
| WORD | GroupNum | :5; | //must be GROUPNUM_TEXTID |
| WORD | TextEncoding | :5; | //Text char set //2bytes |
| BYTE | bTextId[]; | | //var length text identifier string |

}
BCTEXTID, near* NPBCTEXTID, far* LPBCTEXTID;

The start of the Identifier Capability Group contains the GroupLength and GroupNum data fields previously described. A text identification data field functions as a user identification and may include the name and facsimile telephone number of a remote party. The text identification is arranged so that the transmission order is the same as the left to right order of the bytes in a string as one would read them. This is opposite to the byte order of the CSI, TSI, and CIG frames specified in CCITT recommendation T.30.

A text encoding data field indicates the type of text encoding supported by the system 10. The text encoding data field is used to specify the character set of the text identification. A data value of 000 specifies basic ASCII code, and the remaining values may be used to specify other character sets such as DBCS, UNICODE, or Kanji, as well as various national-language variations of ASCII.

The system 10 also includes an Imaging Capability Group to specify advanced imaging capabilities beyond the standard CCITT recommendation T.30 imaging capabilities. The CCITT recommendation T.30 imaging capabilities are specified in the DIS data frame. The Imaging Capability Group structure is shown in Table 4 below.

ported. Digital cover pages are rendered to a bit map at the receiver rather than at the sender thus saving transmission time. The data fields also describe the versions, if any, of address book exchange supported, and of GDI (Microsoft® Windows™ Graphics Device Interface) Metafiles that are supported. They also describe advanced resolutions and encoding schemes, if any, supported in addition to the T.30 standard resolutions and encodings They also describe the available cut-sheet (plain-paper) paper sizes, if any, and specify whether additional non-standard paper sizes are available. Details of these non-standard paper sizes may be obtained by requesting application capabilities, as described above. It should be noted that these parameters may vary depending on the specific FAX machine hardware attached to the system 10. For example, the system 10 may be a portion of a computer having a facsimile interface board and coupled to a laser printer. The resolution and paper size

TABLE 4

```
typedef struct
{
    WORD    GroupLength     :6;    //length of this group in bytes
    WORD    GroupNum        :5;    //group number--must be GROUPNUM_IMAGE
    WORD    fAnyWidth       :1;    //page pixel widths don't have to be exactly T.30
    WORD    vRamboVer       :4;    //version of MS resource-based printing format
                                   //accepted
                                   //2bytes
    BYTE    vCoverAttach    :3;    //version of digital cover pages accepted
    BYTE    vAddrAttach     :2;    //version of address bk attachments accepted
    BYTE    vMetaFile       :2;    //version of GDI metafiles accepted
    BYTE    Undefined1      :1;
                                   //3bytes
    BYTE    HiResolution    :4;    //Resolutions supported in addition of T.30
    BYTE    HiEncoding      :4;    //Encoding formats supported in addition to T.30
                                   //4bytes
    BYTE    CutSheetSizes;         //Cut-sheet (not roll) Paper sizes supported
                                   //5bytes
    BYTE    fOddCutSheet    :1;    //non-standard Cut-sheet sizes also available.
    BYTE    Undefined2      :7;
                                   //6bytes
}
BCIMAGE, far* LPBCIMAGE, near* NPBCIMAGE;
```

The GroupLength and GroupNum fields have been previously described. The various other data fields describe whether page widths may vary slightly from the T.30 standards or must conform exactly. Also the versions, if any, of the Microsoft® Resource-Based Printing Architecture data format that is supported, and of digital cover pages supparameters are governed by the laser printer coupled to the computer.

The system 10 also includes a Polling Capability Group that describes the ability of the receiving FAX machine to respond to polling requests. The group structures for the Polling Capability Group are shown in Table 5 below.

TABLE 5

```
typedef struct
{
    WORD    GroupLength         :6;    //length of this group in bytes
    WORD    GroupNum            :5;    //must be GROUPNUM_POLLCAPS
    WORD    fLowSpeedPoll       :1;    //SEP/PWD/NSC poll reqs accepted
    WORD    fHighSpeedPoll      :1;    //PhaseC pollreqs accepted
                                       //if both the above 00, poll reqs not accepted
    WORD    fPollByNameAvail    :1;    //Poll-by-MessageName msgs available
    WORD    fPollByRecipAvail   :1;    //Poll-by-Recipient msgs available
    WORD    fFilePolling        :1;    //Supports polling for arbitrary files
                                       //2bytes
    BYTE    fAppCapsAvail       :1;    //Application Capabilities available
    BYTE    fNoShortTurn        :1;    //Cannot recv NSC-DTC after EOM-MCF
    BYTE    vMsgRelay           :3;    //Version of Message Relay support
    BYTE    Undefined           :3;
                                       //3bytes
    WORD    AppCapsCRC;                //CRC of machine's Application Capabilites
                                       //5bytes
}
BCPOLLCAPS, far* LPBCPOLLCAPS, near* NPBCPOLLCAPS;
```

As with other capability groups, the Polling Capability Group starts with a GroupLength and GroupNum data fields previously described. The Polling Capability Group also includes data fields to indicate the availability of low speed polling, high speed polling, polling by message name, polling by recipient, and polling by file name. The Polling Capability Group also has data fields to indicate the availability of application capabilities, the support (or lack of support) for Fast-Turnaround (described below), and the version of support, if any, the message relaying. The polling capabilities may be limited by security measures such as a password to prevent unauthorized access to data. The Polling Capability Group also includes a data field for the application capabilities CRC for application capabilities previously described. The value in this data field is 00 if there are no registered application capabilities.

After the recipient's capabilities have been received, the system 10 determines the optimal communication format and converts the data to be transmitted into the format. It sends the receiving FAX machine a DCS frame indicating the T.30 standard capabilities that are being invoked for this particular transmission. If it is sending a message formatted according to the linearized format it sends in addition an NSS frame. The format of the NSS frame is shown in Table 6 below.

During T.30 operations, the transmitting FAX machine always has control of the communication line. To initiate a poll operation, the transmitting FAX machine must perform a turnaround in which the transmitting and receiving FAX machine exchange roles (i.e., the transmitting FAX machine becomes the receiving FAX machine and the receiving FAX machine becomes the transmitting FAX machine). In the T.30 standard a turnaround may be initiated immediately after receiving a DIS frame. This is adequate when a poll operation is the sole purpose of a call, however, when a poll is to be performed after a send is completed, waiting for this point in the protocol causes a delay of about 6 seconds, increasing the cost of the communications. To solve this problem, the current invention incorporates a "fast turnaround" method described below.

In the T.30 protocol, the normal sequence for turnaround following a page is EOM—MCF—T2 timeout—(NSF) DIS—(NSC)DTC. The fast turnaround method of the system 10 makes use of the fact that the receiver's capabilities have already been received at the start of the call, and therefore there is no need to receive the DIS again. Therefore the sender sends the DTC optionally accompanied by NSC and other optional frames immediately after receiving the MCF, rather than waiting for the T2 timeout (6 seconds as defined in T.30) and the DIS. Therefore the fast turnaround

TABLE 6

```
typedef struct
{
    WORD    GroupLength     :6;    //length of this group in bytes
    WORD    GroupNum        :5;    //must be GROUPNUM_NSS
    WORD    vMSGProtocol    :3;    //version of linearized msg to follow
    WORD    Undefined1      :2;
                                   //2bytes
    BYTE    vInteractive    :3;    //version of Interactive protocol being invoked
    BYTE    Undefined2      :5;
}
BCNSS, far *LPBCNSS, near*NPBCNSS;
```

The data fields describe the version of the linearized format being invoked from the linearized message about to be transmitted, or optionally, the version of interactive protocol being invoked.

Following the DCS and NSS, if any, the communication enters Phase-C and the data is transmitted. The data may be in accordance with the T.30 encoding specifications or may be in the linearized format, as previously described. In the linearized form, the data files transmitted by the system 10 may be compressed by a number of known data compression techniques. Similarly, the data files transmitted by the system 10 may be encrypted by a number of well-known encryption algorithms.

Polling

The system 10 has advanced polling features. It allows a user to request a document or file from another of the present design using a document name or a file name. It allows users to request from another of the same design messages that have been addressed to them and are awaiting pickup. It allows Application Capabilities (previously discussed) to be requested, by the user or automatically. Polling can be completed in a call by itself or can be part of a call in which messages are first sent and then polling is initiated. Polling is initiated by causing a turnaround. This is done as follows.

sequence is EOM-MCF-(NSC)DTC, which significantly reduces the turnaround time.

Polling is accomplished by the system 10 as follows. The system 10 sends one or more poll requests to the other machine. Each poll request consists of a document or message name or a file name or a recipient address, and is optionally accompanied by a password. These requests may be sent in linearized form at high speed during the Phase C part of a preceding send, in the case where a poll follows a send in a single call. In the case where there is no preceding send, the poll requests are sent during the turnaround in frames accompanying the DTC. The data fields in the frames are as follows.

Each poll request document or message name, file name or recipient address is sent in an SEP frame. If a request has an associated password, this is sent in a PWD frame immediately following the associated SEP frame. Accompanying the SEP and PWD frames is an NSC frame. The NSC frame is formatted exactly like an NSF (as described above) and contains all of the sender's capabilities. In addition, this NSC contains a Poll Request Group. The format of this group is shown in Table 7 below.

TABLE 7

```
typedef struct
    WORD      GroupLength         :6;   //length of this group in bytes
    WORD      GroupNum            :5;   //must be GROUPNUM_POLLREQ
    WORD      fReturnControl      :1;   //1=return control when done 0=hang up when done
    WORD      TurnReason          :2;   //poll request or stalling
    WORD      fAppCapsReq         :1;   //Application capabilities req
    WORD      fLowSpeedPollReq    :1;   //SEP/PWD/NSC poll req (SEP/PWD
                                              accompanying)
                                        //2bytes
    BYTE      fHighSpeedPollReq   :1;   //PhaseC pollreq preceded this
    BYTE      fPollByNameReq      :1;   //Poll-by-MessageName req
    BYTE      fPollByRecipReq:    :1;   //Poll-by-Recipient req
    BYTE      fFilePollReq        :1;   //arbitrary file poll req
    BYTE      Undefined           :4;
                                        //3bytes
}
BCPOLLREQ, far*LPBCPOLLREQ, near*NPBCPOLLREQ;
#define TURN_POLL         0       //poll request
#define TURN_DONE         1       //request completed, control being returned
#define TURN_FAIL         2       //request failed, control being returned
#define TURN_WAIT         3       //not yet ready
```

The data fields describe whether the sender requests control of the call back after the poll has completed or whether the call should simply be terminated, also whether the NSC is being sent as part of a poll-request or as part of a stall (described below). The fields also specify whether application capabilities list is being requested, whether the poll request is contained in accompanying SEP and PWD frames (as described above) or was sent in a preceding Phase-C. The data fields also specify whether poll by document-name, poll by recipient-name and/or poll by file name are being invoked.

In response to this turnaround, the receiving FAX machine assumes the role of transmitting FAX machine and transmits the requested information (application capabilities, poll-messages, and/or data files). The system 10 takes appropriate precautionary security measures, such as verifying passwords, before responding to turnaround operations.

Each of the facsimile messages in Phase C can be encapsulated in a binary file transfer (BFT) data frame as described in CCITT recommendation T.434. The data files transmitted by the system 10 may be compressed by a number of well known data compression techniques. In addition, the data files transmitted by the system 10 can be encrypted by a number of well known encryption algorithms.

It is often the case that when a poll request is made, the FAX machine being polled requires some time to locate, retrieve and appropriately format the document, message or file being polled. The T.30 standard makes no provision for this. If a poll response is not received within a limited period of time following turnaround, the connection times out and is terminated. The current invention incorporates a means for a pollee to "stall" the poller while it is retrieving polled data. While applicable to polling the stall mechanism is more generally applicable to all phases and functions of the connection and may be used to stall when a delay is required under other circumstances such as acknowledgment of secure message transmission, acknowledgments of relay instructions, or the like.

A system of the current design stalls by sending a DTC frame accompanied by an NSC frame with the following format. The NSC frame in this case contains the Poll Request Group contain above. The TurnReason data field of the Group is set to the value TURN_WAIT defined above.

This indicates that the pollee is processing the request and requires some more time. Upon receiving this frame the poller, a system of this design, replies with a DTC frame accompanied by an NSC which contains the Poll Request Group, and the TurnReason field is set to TURN_POLL. However, the SEP and PWD frames, if any, are not sent a second time. The poller and pollee therefore send NSC-DTC pairs (with the TurnReason field set on to TURN_POLL and TURN_WAIT, respectively) back and forth until the pollee is ready to transmit the response to the request. As a precautionary measure either side may terminate the connection at any time if the delay becomes excessively long.

Thus, the system 10 permits the use of all of the data processing capabilities that the FAX machines may possess. The examples presented herein relate to facsimile communication. However, it should be noted that the principles of capabilities exchange are applicable to communication between any computers.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for controlling facsimile communication between first and second facsimile machines, the system comprising:

a first facsimile mode storage area in the first facsimile machine having a first facsimile data processing mode list containing at least one facsimile data processing mode of the first facsimile machine defined by an industry standard;

facsimile capability transfer means defined by said standard for transferring said first facsimile data processing mode list from the first facsimile machine to the second facsimile machine during a negotiation phase of the facsimile communication;

a first custom mode storage area in the first facsimile machine having a first custom data processing mode list containing at least one data processing mode of the first facsimile machine;

custom capabilities transfer means using a non-standard facilities data frame to transfer said first custom data processing mode list from the first facsimile machine to the second facsimile machine during said negotiations phase;

a first application data processing mode storage area in the first facsimile machine having a first application program data processing capabilities list containing data related to software application program data processing capabilities of the first facsimile machine;

a second facsimile mode storage area in the second facsimile machine having a second facsimile data processing mode list containing at least one facsimile data processing mode of the second facsimile machine defined by said industry standard, said first and second facsimile data processing mode lists having at least one mutually compatible facsimile data processing mode;

a second custom mode storage area in the second facsimile machine having a second custom data processing mode list containing at least one data processing mode of the second facsimile machine;

a second application data processing mode storage area in the second facsimile machine having a second application program data processing capabilities list containing data related to software application program data processing capabilities of the second facsimile machine;

application capabilities transfer means for transferring said first application program capabilities list to the second facsimile machine; and selection means within the second facsimile machine for selecting a transfer form in which to transfer a data file, said selection means comparing said first and second application program capabilities lists and said first and second custom mode lists to determine if there is an application program capability common to both said first and second application program capabilities lists or a custom data processing mode common to both said first and second custom mode lists, said selection means selecting said common application program capability from said first and second application program capabilities lists if said data file utilizes said common application program capability, selecting said common custom data processing mode from said first and second custom mode lists if said common application program capability is not selected, and selecting said mutually compatible data processing mode from said first and second facsimile mode lists if neither said common application program capability nor said common custom data processing mode are selected.

2. The system of claim 1 wherein said processing capabilities transfer means transfers said first application program capabilities list to the second facsimile machine in a data transfer phase defined by said industry standard.

3. A system for controlling communication between first and second facsimile machines, the system comprising:

a first facsimile mode storage area in the first facsimile machine having a first facsimile data processing mode list containing at least one facsimile data processing mode of the first facsimile machine;

capability transfer means for transferring said first facsimile data processing mode list from the first facsimile machine to the second facsimile machine;

a first custom mode storage area in the first facsimile machine having a first custom data processing mode list containing at least one data processing mode of the first facsimile machine, said data processing mode comprising imaging data related to imaging capabilities of the first facsimile machine and polling data related to polling capabilities of the first facsimile machine;

processing capabilities transfer means for transferring said first custom mode list to the second facsimile machine;

a second facsimile mode storage area in the second facsimile machine having a second facsimile data processing mode list containing at least one facsimile data processing mode of the second facsimile machine, said first and second facsimile data processing mode lists having at least one mutually compatible facsimile data processing mode;

a second custom mode storage area in the second facsimile machine having a second custom data processing mode list containing at least one data processing mode of the second facsimile machine; and selection means within the second facsimile machine for selecting a transfer form in which to transfer a data file from the second facsimile machine to the first facsimile machine, said selection means comparing said first and second custom mode lists to determine if there is a custom data processing mode common to both said first and second custom mode lists and selecting said common mode as said transfer form, said selection means using said mutually compatible data processing mode from said first and second facsimile mode lists if said first and second custom mode lists do not have said common data processing mode.

4. The system of claim 3, further including a conversion processor in the second facsimile machine for converting said data file into said transfer form.

5. The system of claim 3, further including first and second communication controllers within the first and second facsimile machines, respectively, to control the transfer of said data file from the second facsimile machine to the first facsimile machine.

6. The system of claim 3, further including first and second application data processing mode storage areas in the first and second facsimile machines, respectively, each of said application data processing mode storage areas containing an application data processing mode list of application data processing capabilities of the first and second facsimile machines, respectively, said capability transfer means transferring said first application data processing mode list from the first facsimile machine to the second facsimile machine, and said selection means using said first and second application data processing mode lists to determine if said transfer form is mutually compatible with said application data processing capabilities in said first and second application data processing mode lists.

7. The system of claim 6, further including an application mode list request command, the first facsimile machine transferring said first application mode list to the second facsimile machine upon receipt of said application mode list request command from the second facsimile machine.

8. The system of claim 3, further including:

first and second application data processing mode storage areas in the first and second facsimile machines, respectively, each of said application data processing mode storage areas containing an application data processing mode list of application data processing capabilities of the first and second facsimile machines, respectively; and application mode transfer means for transferring said first application mode list from the first facsimile machine to the second facsimile machine in a predetermined format, said selection means selecting a mutually compatible application data processing mode from said first and second application mode lists.

9. The system of claim 8 wherein said predetermined format is a CCITT binary file transfer format.

10. The system of claim 3 wherein the second facsimile machine processes said data file into an intermediate form based on said first custom mode list, said intermediate form being said transfer form, the first facsimile machine receiving said data file in said intermediate form and further processing said data file into a final form different from said intermediate form.

11. The system of claim 3, further including mode transfer means for automatically transferring said custom mode list during a negotiation phase of facsimile transmission.

12. The system of claim 11 wherein said mode transfer means uses non-standard facilities (NSF) data frames to transfer said first custom mode list to the second facsimile machine.

13. The system of claim 3 wherein said first custom mode list is transferred to the second facsimile machine in a predetermined format having variable length data fields in at least a first non-standard facilities (NSF) data frame, said NSF data frame having at least a first capability group, said capability group containing a length data field having a data value indicative of the length of said capability group, an identification data field having a data value indicative of the type of capability, and a variable length data field describing said capability group.

14. The system of claim 13, wherein said variable length data field includes at least a first data field containing information relating to the availability of data processing capabilities comprising one of a security mode data field containing data related to the ability to process encrypted messages, a routing data field containing data related to the ability to route received messages, a linearized message data field containing data related to the ability to process linearized messages, a binary data message data field containing data related to the ability to process binary data within said linearized messages, and a compression data field containing data related to the ability to process compressed data beyond said standard facsimile data processing modes.

15. The system of claim 13 wherein said first capability group includes an identifier capability group containing said length data field, said identification data field, and said variable length data field containing information relating to data text codes available.

16. The system of claim 13 wherein said first capability group includes an imaging capability group containing said length data field, said identification data field, and said variable length data field containing information relating to said imaging capabilities of the first facsimile machine above standard facsimile machine imaging capabilities.

17. The system of claim 16 wherein said variable length data field includes at least a first data field comprising one of a printer format data field containing data related to the ability to process resource-based printing format data, a cover page data field containing data related to the ability to process digital cover page data, an address book data field containing data related to the ability to process address book data, a metafile data field containing data related to the ability to process metafile data, a compression data field containing data relating to the ability to process compressed data beyond said facsimile data processing modes, a resolution data field containing data relating to the ability to process data having different data resolutions beyond said facsimile data processing modes, an encoding data field containing data relating to the ability to process data having different data encoding modes beyond said facsimile data processing modes, and a paper size data field containing data relating to the ability to process data using different paper sizes beyond said facsimile data processing modes.

18. The system of claim 13 wherein said first capability group includes an polling capability group containing said length data field, said identification data field, and said variable length data field containing information relating to said polling capabilities of the first facsimile machine.

19. The system of claim 18 wherein said variable length data field includes at least a first data field comprising one of a low speed data field containing data related to the ability to process poll requests at low speed, a high speed data field containing data related to the ability to process poll requests at high speed, a name data field containing data related to the ability to process poll requests by message name, a recipient name data field containing data related to the ability to process poll requests by recipient name, a file polling data field containing data related to the ability to process poll requests by file name, and a relay data field containing data related to the ability to relay messages to a third facsimile machine.

20. The system of claim 18 wherein said polling capabilities include a data field containing a value indicating a current status of application data processing capabilities within the first facsimile machine.

21. The system of claim 12, further including an encryption circuit within the first facsimile machine to encrypt said NSF data frame prior to transfer to the second facsimile machine and a decryption circuit within the second facsimile to decrypt said NSF data frames.

22. The system of claim 21 wherein said encryption circuit uses Digital Encryption Standard to encrypt said NSF data frame.

23. A system for controlling communication between first and second computers, the system comprising:

a first custom mode storage area in the first computer having a first custom data processing mode list containing a plurality of basic data processing capabilities of the first computer;

a first application mode storage area in the first computer having a first application data processing mode list containing at least one application data processing mode of the first computer;

a second custom mode storage area in the second computer having a second custom data processing mode list containing a plurality of basic data processing capabilities of the second computer, said first and second custom data processing mode lists having at least one mutually compatible custom data processing capability;

a second application mode storage area in the second computer having a second application data processing mode list containing at least one application data processing mode of the second computer;

capability transfer means for transferring said first custom data processing mode list and said first application data processing mode list from the first computer to the second computer; and selection means within the second computer for selecting a transfer form in which to transfer a data file from the second computer to the first computer, said selection means comparing said first and second application data processing mode lists and selecting a common application data processing mode from said first and second application data processing mode lists as said transfer form, said selection means selecting mutually compatible portions of said plurality of first and second basic data processing capabilities from said first and second custom data processing mode lists if said first and second application data processing mode lists do not have said common application data processing mode.

24. The system of claim 23, further including a conversion processor in the second computer for converting said data file into said transfer form.

25. The system of claim 23, further including first and second communication controllers within the first and second computers, respectively, to control the transfer of said data file from the second computer to the first computer.

26. A method using first and second facsimile machines for controlling communication between the first and second facsimile machines, the method comprising the steps of:

transferring a first facsimile data processing mode list from the first facsimile machine to the second facsimile machine, said first facsimile data mode list containing at least one facsimile data processing mode of the first facsimile machine;

transferring a first custom data processing mode list from the first facsimile machine to the second facsimile machine, said first custom mode list containing a plurality of data processing modes of the first facsimile machine, said plurality of data processing parameters comprising imaging data related to imaging capabilities of the second facsimile machine and printing data related to printing capabilities of the second facsimile machine;

comparing said first custom mode list with a second custom data processing mode list stored in the second facsimile machine and containing at least one custom data processing mode of the second facsimile machine to determine if there is a custom data processing mode common to both said first and second custom mode lists;

if said common custom data processing mode exists, transferring a data file from the second facsimile machine to the first facsimile machine using said common data processing mode selected from said first and second custom mode lists;

if said common data processing mode does not exist in said first and second custom mode lists, comparing said first facsimile mode list with a second facsimile data processing mode list stored in the second facsimile machine and containing at least one facsimile data processing mode of the second facsimile machine, said first and second facsimile mode lists having at least one mutually compatible facsimile data processing mode; and transferring said data file from the second facsimile machine to the first facsimile machine in said mutually compatible data form selected from said first and second facsimile mode lists.

27. The method of claim 26 wherein said first custom mode list is transferred using at least a first non-standard facilities (NSF) data frame containing at least a first capability group, each capability group containing a length data field indicating the length of said capability group.

28. The method of claim 27 wherein said first capability group contains a descriptor data field describing said capability.

29. The method of claim 28 wherein said first descriptor data field includes at least a first data field containing information relating to the availability of data processing capabilities comprising one of a security mode data field containing data related to the ability to process encrypted messages, a routing data field containing data related to the ability to route received messages, a linearized message data field containing data related to the ability to process linearized messages, a binary data message data field containing data related to the ability to process binary data within said linearized messages beyond said standard facsimile data processing modes.

30. The method of claim 28 wherein said first capability group includes an identifier capability group containing said length data field and said descriptor data field containing information relating to data text codes available.

31. The system of claim 28 wherein said first capability group includes an imaging capability group containing said length data field and said descriptor data field containing information relating to imaging capabilities of the first facsimile machine above standard facsimile machine imaging capabilities.

32. The method of claim 28 wherein said descriptor data field includes at least a first data field comprising one of a printer format data field containing data related to the ability to process resource-based printing format data, a cover page data field containing data related to the ability to process digital cover page data, an address book data field containing date related to the ability to process address book data, and a metafile data field containing data related to the ability to process metafile data.

33. The system of claim 28 wherein said first capability group includes a polling capability group containing said length data field, and said descriptor data field containing information relating to polling capabilities of the first facsimile machine.

34. The system of claim 33 wherein said descriptor data field includes at least a first data field comprising one of a low speed data field containing data related to the ability to process poll requests at low speed, a high speed data field containing data related to the ability to process poll requests at high speed, a name data field containing data related to the ability to process poll requests by message name, a recipient name data field containing data related to the ability to process poll requests by recipient name, a file polling data field containing data related to the ability to process poll requests by file name, and a relay data field containing data related to the ability to relay messages to a third facsimile machine.

35. The method of claim 26, further including the steps of:

transferring a first application data processing mode list from the first facsimile machine to the second facsimile machine, said first application mode list containing at least a first application data processing mode of the first facsimile machine, said first application data processing mode being indicative of the ability of the first facsimile machine to process data in a format defined by a first standard application software program;

comparing said first application mode list with a second application data processing mode list stored in the second facsimile machine and containing at least a second application data processing mode of the second facsimile machine, said second application data processing mode being indicative of the ability of the second facsimile machine to process data in a format defined by a second standard application software program to determine if said first and second application data processing modes are common to both said first and second application mode lists; and transferring said data file from the second facsimile machine to the first facsimile machine in said common application data processing mode selected from said first and second application mode lists.

36. The system of claim 35 wherein said custom mode list includes a data field containing a value indicating the current status of said application capabilities within the first facsimile machine.

37. The method of claim 35 wherein the first facsimile machine transfers said first application mode list to the second facsimile machine upon receipt of an application mode list request command from the second facsimile machine.

38. The method of claim 27, further including the steps of encrypting said NSF data frame prior to transfer to the second facsimile machine and decrypting said encrypted NSF data frame within the second facsimile machine.

39. The method of claim 38 wherein said step of encryption uses Digital Encryption Standard to encrypt said NSF data frame.

40. The method of claim 26, further including the steps of encrypting said first custom data processing mode list prior to transfer to the second facsimile machine, and decrypting said encrypted first custom data processing mode list within the second facsimile machine.

41. The method of claim 26 wherein said common data processing mode is selected from portions of said plurality of data processing modes in said first and second custom mode lists.

42. A method using first and second computers for controlling transfer of a data file having a first format between the first and second computers, the method comprising the steps of:

transferring a first custom data processing mode list from the first computer to the second computer, said first custom mode list containing at least a first custom data processing mode of the first computer;

transferring a first application data processing mode list from the first computer to the second computer, said first application mode list containing at least a first application data processing mode of the first computer, said first application data processing mode being indicative of the ability of the first computer to process data in a format defined by a first standard application software program;

comparing said first application mode list with a second application data processing mode list stored in the second computer and containing at least a second application data processing mode of the second computer to determine if said first and second application data processing modes are common to both said first and second application mode lists, said second application data processing mode being indicative of the ability of the second computer to process data in a format defined by a second standard application software program;

if said first and second application data processing modes are common to both said first and second application mode lists, converting the data file from the first format to a first transfer format compatible with said common application data processing mode;

if said first and second application data processing modes are not common to both said first and second application mode lists, comparing said first custom mode list with a second custom data processing mode list stored in the second computer and containing at least one custom data processing mode of the second computer, said first and second custom mode lists having at least one mutually compatible custom data processing mode;

converting the data file from the first format to a second transfer format compatible with said mutually compatible custom data processing mode if said first and second application data processing modes are not common to both said first and second application mode lists; and transferring the data file from the second computer to the first computer in said first transfer format if said first and second application data processing modes are common to both said first and second application mode lists or transferring the data file from the second computer to the first computer in said second transfer format if said first and second application data processing modes are not common to both said first and second application mode lists.

\* \* \* \* \*